Aug. 29, 1933.   F. D. WILSON   1,924,703
POWER TAKE-OFF MECHANISM
Filed Nov. 7, 1927   3 Sheets-Sheet 3
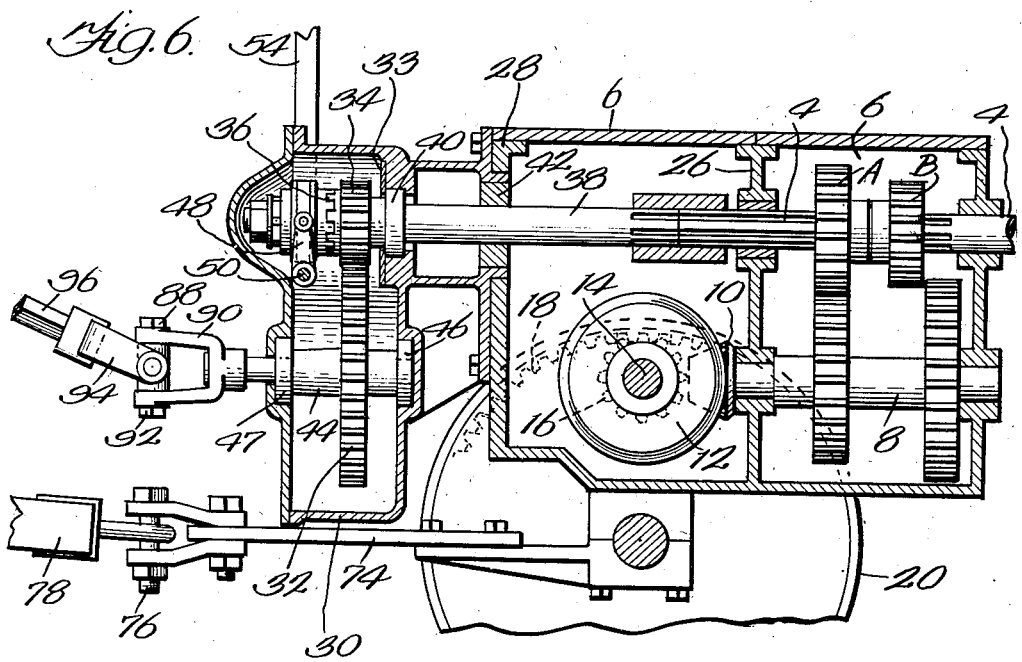
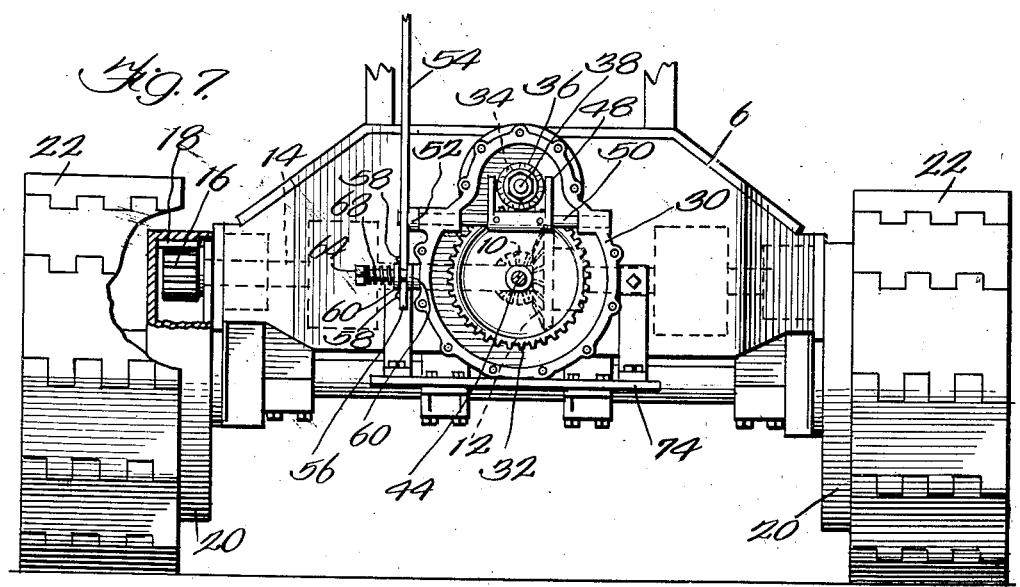
Inventor:
Fred D. Wilson
By Wallace R. Lane
Attys.

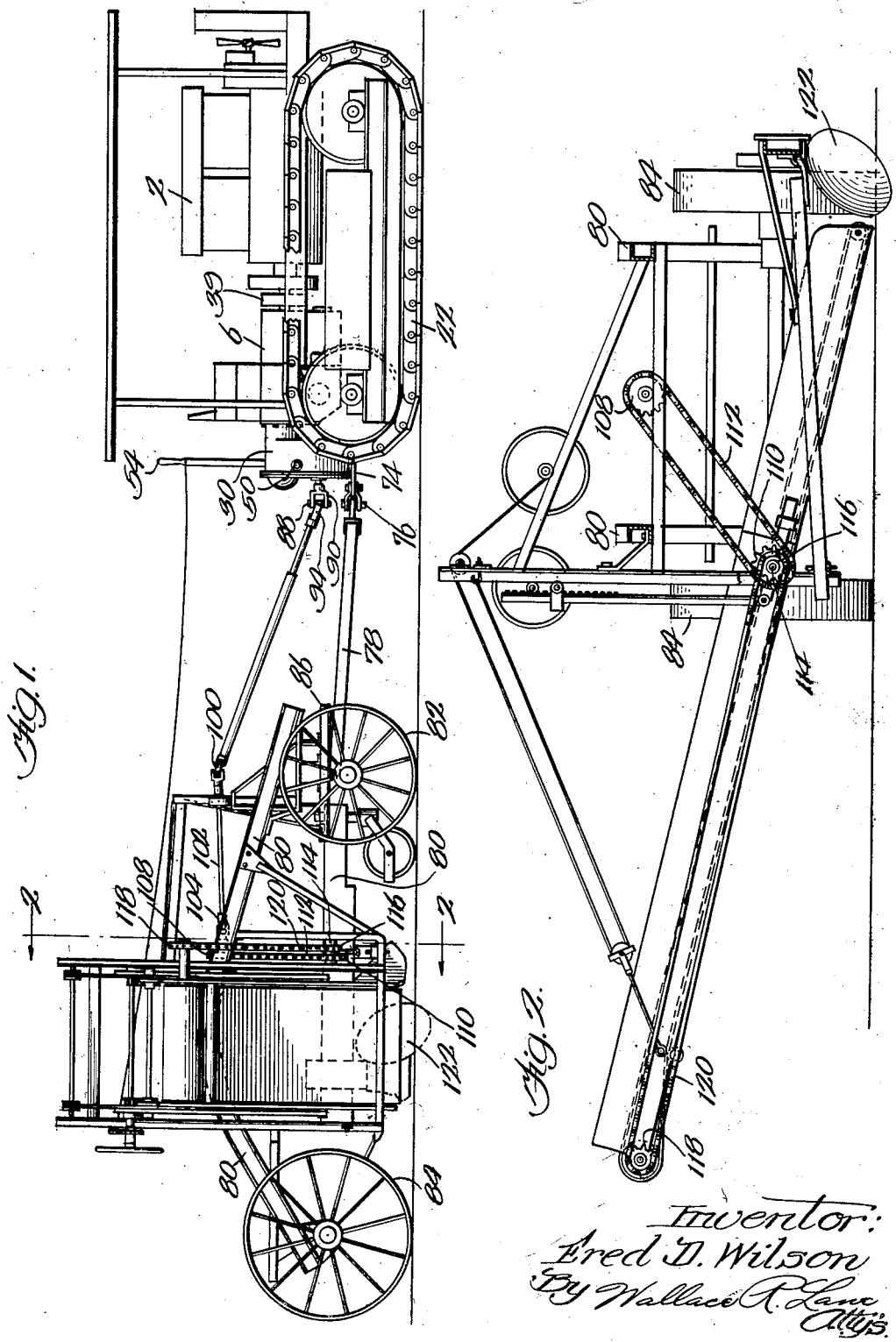

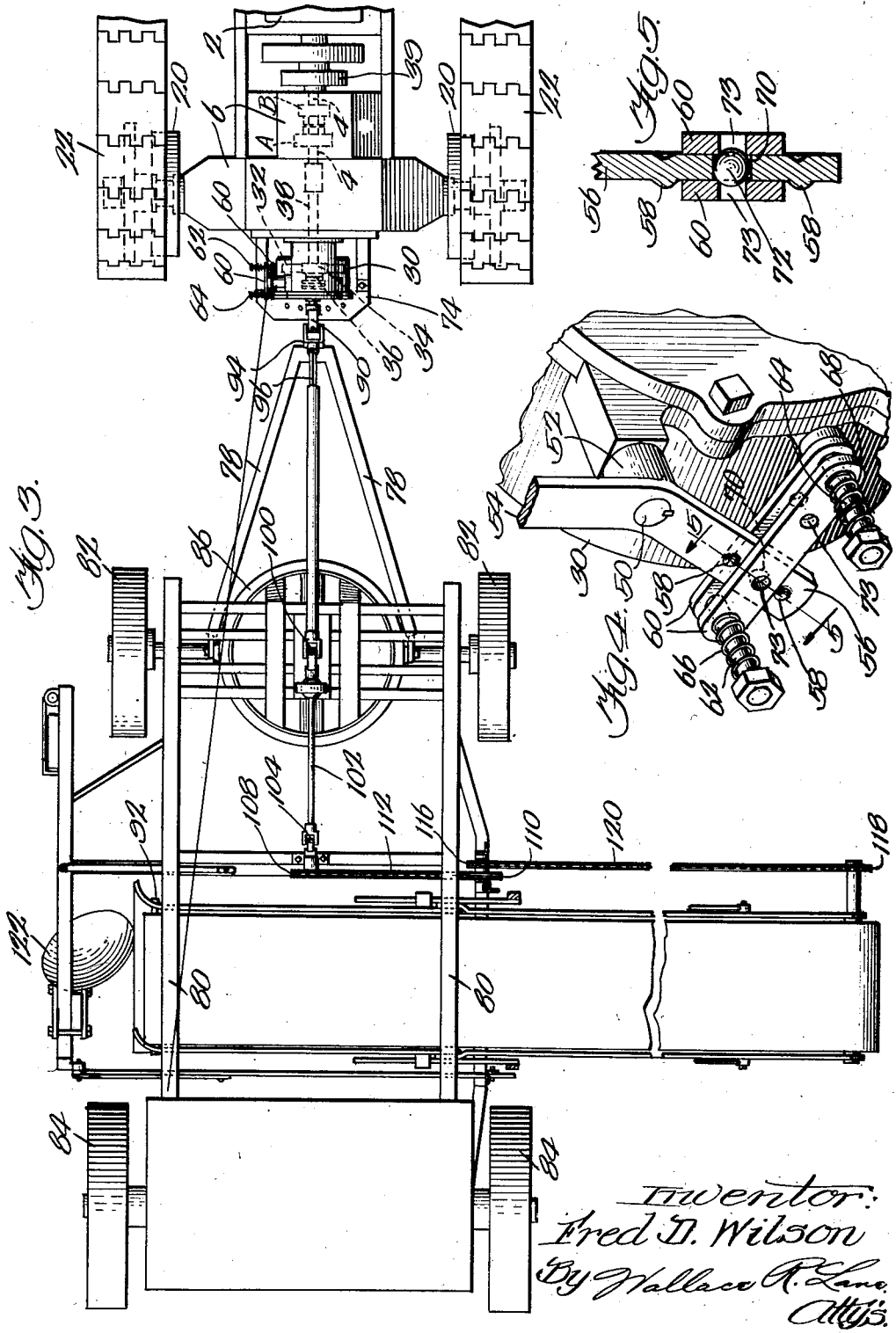

Patented Aug. 29, 1933

1,924,703

UNITED STATES PATENT OFFICE 1,924,703

POWER TAKE-OFF MECHANISM

Fred D. Wilson, Harvey, Ill., assignor to Austin Manufacturing Co., Chicago, Ill., a corporation of Illinois Application November 7, 1927. Serial No. 231,692

4 Claims. (Cl. 180—14)

This invention relates to power take-off mechanisms, but more particularly to the provision of a power take-off mechanism for elevating graders, the power being supplied from the ordinary tractor.

Among the objects of my invention are to provide a power take-off mechanism to be attached to a tractor and which mechanism increases the dirt moving capacity of both the grader and tractor and reduces the labor of operation; further to increase the efficiency of the tractor motor by the means of connecting it to and driving the elevating mechanism; further to provide a steady flow of power from the tractor motor to the elevator, thereby to increase the material moving capacity and efficiency of the elevator; further to remove all driving strain from the grader wheels, axles, boxings, gearings, and the like and thereby increasing the life of the grader and elevator and eliminating the necessity of repair and decreasing the cost of upkeep; further to drive the elevator mechanism from the front so as not to interfere with the usual rear driving mechanism for the elevator, i. e. the drive from the rear traction wheels of the grader; further to drive the elevator mechanism direct from the tractor motor and thereby eliminating the necessity of the clutch drive from the wheels of the grader and in this manner side skidding of the grader due to uneven traction of the driving wheels is eliminated; further to provide a grader trailed from a tractor and having the elevator thereof driven directly from the prime mover of the tractor; further to provide attachment for a tractor adapted to replace the usual belt pulley attachment regularly furnished with the tractor, which attachment contains speed reduction gearing and a clutch for connecting at will the prime mover shaft with the elevator shaft and driving the latter from the tractor engine; further to provide novel construction and details of the gear casing and clutch attachments and particularly the shifter for the clutch; further to provide means of locking the lever in shifted position; further to provide universal joints between the tractor and the elevating mechanism of the grader and particularly to locate the universal joints so that free relative turning of the tractor and the grader is secured without interfering with the power drive between the tractor and the grader; further to provide a driving connection preferably in the form of a sprocket drive between the end of the shaft on the tractor and the conveyor or the elevator and to construct and locate this connection so as to provide adjustment of the elevator without distorting the power drive thereto; further to provide a power take-off mechanism of maximum simplicity, efficiency, economy and ease of operation; and such further objects, advantages and capabilities as will later more fully appear.

My invention further resides in the combination, construction and arrangement of parts illustrated in the accompanying drawings, and while I have shown therein a preferred embodiment, I desire it to be understood that the same is susceptible of modification and change without departing from the spirit of my invention.

In the drawings:

Fig. 1 is a view in side elevation showing my novel power take-off device as applied to a tractor for driving an elevating grader.

Fig. 2 is an elevational view of the elevating grader taken on the line 2—2 of Fig. 1.

Fig. 3 is a plan view of my power take-off as applied to the driving of the elevating grader from the tractor, the driving mechanism of the tractor being shown in dotted outline.

Fig. 4 is a fragmentary view in perspective of my self-locking lever for operating the clutch mechanism.

Fig. 5 is a fragmentary view in cross section, taken on the line 5—5 of Fig. 4.

Fig. 6 is a fragmentary vertical cross-sectional view showing the means of applying and driving my power take-off device from the rear of a tractor.

Fig. 7 is a fragmentary view in rear elevation showing my power take-off device as applied to the rear of a tractor, the housing cover having been removed to show more clearly the cooperating gears and other mechanism.

Referring to the drawings; the numeral 2 designates the prime mover or motor of the tractor. This prime mover rotates the shaft 4 for driving the propelling mechanism of the tractor through suitable gearing in the housing 6. A shaft 8 is driven by the gearing on the shaft 4. This shaft 8 is provided at its rear portion with a pinion 10 which meshes with a gear 12 for driving the shaft 14. A gear 16 is also located upon the shaft 14 and in turn drives the large gear 18 for propelling the tracks 22 of the tractor. A housing 20 encompasses the gears 16 and 18, this housing preventing the entrance of any foreign matter into the gear mechanism.

The fluted shaft 4 is operatively connected to the driving gears in the housing 6. A brace member 26 of this housing provides a bearing or bracket for the shafts 4 and 8 and keeps these shafts in perfect alinement. The rear portion 28 of the housing 6 is connected by any suitable means to the housing 30. The housing 30 provides a gear case for the speed reduction gears and clutch mechanism. This housing or gear case is readily attached to the rear of the tractor, and takes the place of and connects in the same manner as the belt pulley attachment which is regularly furnished with the tractor. Positioned in the housing or gear case 30 is the driven gear 32 and the pinion 34 for driving the gear. Operatively connected to the pinion 34 is a clutch mechanism 36, the pinion being driven by a shaft 38 which extends forward into the tractor and connects directly with the motor crank shaft by means of a regular tractor coupling. The pinion 34 is loose on the shaft and is provided with clutch teeth adapted to be engaged by the teeth on the hub or clutch mechanism 36 splined or otherwise connected to the shaft. It is understood that a friction clutch 39 of conventional design connects the shaft 4 to the motor or prime mover and that through the medium of a conventional gear shift lever (not shown), the gears A and B may be positioned so that they rotate the shaft 8 or not, as desired. When gears A and B are not in a position to drive the gears on shaft 8, the tractor is said to be in neutral, and in this connection it is well to note that power may still be applied to the elevator whether the tractor is traveling or not. This is advantageous for the reason that it is sometimes desirable to discharge an accumulation of material remaining upon the elevator, into a wagon without any forward movement. Bearing 40 and a bearing surface or bracket 42 are provided for the shaft 38. A shaft 44 is driven by the gear 32, this shaft being provided with bearings 46 and 47 provided in the walls of the housing.

A shifter fork or clutch throw 48 is provided with a shaft 50 keyed to the collar 52 of the lever or shifter shaft 54 on the exterior of the housing. The lever or shifter shaft has a downwardly and outwardly bent portion 56, the bent portion passing between the arms or plates 60. A pair of knobs or projections 58 bear against the plates and prevent any longitudinal movement of the plates. These plates are slidably held on a pair of pins 62 and 64. A pair of springs 66 and 68 bear against the surface of the outer plate 60 and thus allow this plate a limited transverse movement on the pins 62 and 64. The outwardly bent portion 56 of the lever 54 is provided with a circular opening providing a race for a ball bearing 72. A pair of openings 73 in each of the plates or arms 60 provide recesses adapted to receive the ball bearing 72 upon the shifting of the lever 54. Because of the projections 58, the bearing 72 and openings 73 will remain in alinement. The diameter of the ball bearing 72 is greater than the diameter of the openings 73, so that when the opening 70 is opposite either of the openings 73, the bearing 72 engages the respective opening 73 and the lever is in locked position and this in turn locks the clutch mechanism in or out of engagement, depending upon which opening 73 engages the ball bearing 72. When the lever is in a position shown in Fig. 4 of the drawings, the openings in the lever arms and plates or arms 60, would be in locked position. When the lever arm is moved, the position of the bearing 72 would necessitate the forcing apart of the plates or arms 60 so that the lever could be moved into another position. The springs 66 and 68 would bear against the outer plate 60 so that when the lever is in locked position, a slight jar or impulse would not dislodge the same, but forceful manipulation of the lever would be necessary to dislodge the bearing. The clutch lever is arranged so that by means of a rope the grader operator can at any time instantly stop the elevator belt which is done each time the machine turns around. The tractor operator can, by means of the lever only, either engage or disengage the clutch from his position on the tractor.

A draw-bar or arm 74 is suitably connected to the rear shaft of the tractor for providing the forward propulsion of the elevating grader. A universal joint 76 is attached to this bar and is also attached to the V-shaped bar 78 which is in turn attached to the frame 80 of the grader. This grader is provided with front wheels 82 and rear wheels 84 for driving the same, and is provided with a turning pivot 86 at its front axle so that the grader may be turned square around.

A universal joint 88 is connected to the driven shaft 44 of the power take-off mechanism. This universal joint 88 comprises a yoke 90 and a pivot bolt 92 to which is attached a knuckle 94 for attachment to the draw bar or arm 96 for transmitting the power from the prime-mover to the elevating mechanism. A second universal joint 100 is provided directly over the turning pivot of the grader. This universal joint connects with a rod or shaft 102 to a third universal joint 104 positioned along side of the elevating mechanism. Operatively attached to this third universal joint is a sprocket wheel or gear 108 which drives a second sprocket wheel or gear 110 by means of a chain drive 112. On a shaft 114 of the sprocket wheel 110 is a smaller sprocket wheel 116 which drives a similar sprocket wheel 118 at the upper end of the elevator by means of a chain drive 120. This double sprocket arrangement which is located rather low on the frame in front of the elevator is of utmost importance in that the elevation of delivery from the conveyor belt 120 must be frequently changed by adjusting the elevator height. It is therefore desirable to place this sprocket at a point on a line between the two end rollers of the elevator when it is in an average position thus enabling a limited amount of adjustment, either up or down, without materially affecting the length of the drive. A disc 122 is provided adjacent the lower end of the conveyor belt.

The arrangement of the power take-off at the front side of the elevator is very advantageous for the reason that this arrangement leaves the regular drive undisturbed. The location of the second or universal joint, which is directly over the turning pivot of the grader front axle, allows for the grader to be turned square around at the end, otherwise undesirable telescopic action of the shaft becomes necessary.

Having thus disclosed my invention,
I claim:

1. In a power take-off device having a speed reducing attachment, a clutch means therefor, a lever mounted in said attachment for operating said clutch means, guide members for an arm of said lever and provided with spaced openings, and means carried by said arm for engaging any selected openings for locking said lever.

2. In a power take-off device having a speed reducing attachment, a clutch means therefor, a lever mounted in said attachment for operating said clutch means, spaced guide members having spaced openings therein, an arm of said lever being movable between said members and provided with an opening, and a ball bearing in said opening and adapted to be received in any selected openings for locking said lever.

3. In a power take-off device having a speed reducing attachment, a clutch means therefor, a lever mounted in said attachment for operating said clutch means, spaced guide members having spaced openings therein, an arm of said lever being movable between said members and provided with an opening, a ball bearing in said opening and adapted to be received in any selected openings for locking said lever, and resilient means for maintaining said members in contact relation with said arm.

4. In a power take-off device for drawn elevating mechanisms, a casing adapted to be attached to the rear of a tractor, a shaft mounted in said casing and extending to and coupled with the drive shaft of said tractor, a gear rotatably mounted on said shaft and having a clutch element, a hub splined to said shaft and having a clutch element adapted to engage the clutch element of said gear, a counter-shaft mounted in said casing, a gear mounted on said counter-shaft and meshing with said first mentioned gear, means driven by said counter-shaft for operating said drawn elevating mechanism, and means for moving said hub.

FRED D. WILSON.